United States Patent
Kawasaki et al.

(10) Patent No.: US 11,203,087 B2
(45) Date of Patent: Dec. 21, 2021

(54) FLUX AND SOLDER PASTE

(71) Applicant: Senju Metal Industry Co., Ltd., Tokyo (JP)

(72) Inventors: Hiroyoshi Kawasaki, Tokyo (JP); Masato Shiratori, Tokyo (JP); Tomohisa Kawanago, Tokyo (JP)

(73) Assignee: Senju Metal Industry Co., Ltd., Tokyo (JP)

( * ) Notice: Subject to any disclaimer, the term of this patent is extended or adjusted under 35 U.S.C. 154(b) by 0 days.

(21) Appl. No.: 16/957,753

(22) PCT Filed: Dec. 28, 2018

(86) PCT No.: PCT/JP2018/048467
§ 371 (c)(1),
(2) Date: Jun. 25, 2020

(87) PCT Pub. No.: WO2019/132003
PCT Pub. Date: Jul. 4, 2019

(65) Prior Publication Data
US 2020/0346308 A1 Nov. 5, 2020

(30) Foreign Application Priority Data
Dec. 29, 2017 (JP) .............................. JP2017-255176

(51) Int. Cl.
*B23K 35/362* (2006.01)
*B23K 35/02* (2006.01)

(52) U.S. Cl.
CPC .......... *B23K 35/362* (2013.01); *B23K 35/025* (2013.01)

(58) Field of Classification Search
None
See application file for complete search history.

(56) References Cited

U.S. PATENT DOCUMENTS

| | | |
|---|---|---|
| 2006/0011267 A1 | 1/2006 | Kay et al. |
| 2008/0135133 A1 | 6/2008 | Hagiwara |
| 2015/0102090 A1 | 4/2015 | Arai et al. |
| 2018/0200845 A1 | 7/2018 | Kawanago et al. |
| 2020/0361039 A1* | 11/2020 | Kawanago ........... B23K 35/025 |

FOREIGN PATENT DOCUMENTS

| | | |
|---|---|---|
| CN | 1972779 A | 5/2007 |
| CN | 105855749 A | 8/2016 |
| JP | 2005144518 A | 6/2005 |
| JP | 2007532321 A | 11/2007 |
| JP | 2013188761 A | 9/2013 |
| JP | 6160788 B1 | 7/2017 |
| JP | 2018111117 A | 7/2018 |
| JP | 2019118929 A | 7/2019 |
| WO | 2005110657 A2 | 11/2005 |
| WO | 2006025224 A1 | 3/2006 |

OTHER PUBLICATIONS

Machine translation of JP 2005-144518A. (Year: 2005).*

* cited by examiner

*Primary Examiner* — Xiaowei Su
(74) *Attorney, Agent, or Firm* — The Webb Law Firm

(57) ABSTRACT

A flux in which solder wettability can be maintained and with which it is possible to suppress the amount of residue after soldering and realize low residue. This flux includes 65-99 wt % of a solvent, and also includes 1-13 wt % of at least one acid selected form a dimer acid that is a reaction product of oleic acid and linoleic acid; a trimer acid that is a reaction product of oleic acid and linoleic acid; a hydrogenated dimer acid obtained by hydrogenating dimer acid that is a reaction product of oleic acid and linoleic acid; and a hydrogenated trimer acid obtained by hydrogenating a trimer acid that is a reaction product of oleic acid and linoleic acid.

18 Claims, No Drawings

FLUX AND SOLDER PASTE

CROSS-REFERENCE TO RELATED APPLICATION

This application is the United States national phase of International Application No. PCT/JP2018/048467 filed Dec. 28, 2018, and claims priority to Japanese Patent Application No. 2017-255176 filed Dec. 29, 2017, the disclosures of which are hereby incorporated by reference in their entirety.

TECHNICAL FIELD

The present invention relates to a flux for use in soldering and a solder paste using the flux.

BACKGROUND

In general, a flux used in soldering has effects of chemically removing metal oxides present on solder and the metal surface of a joint target to be soldered and allowing movement of metal elements at the boundary between the two. Therefore, by soldering using the flux, an intermetallic compound can be formed between the solder and the metal surface of the joint target, so that strong joint can be obtained.

In recent years, with the development of small information devices, rapid miniaturization of electronic components to be mounted has progressed. In order to meet the demand for the reduction of connection terminals and the reduction of the mounting area due to the demand for miniaturization, the electronic components employs a ball grid array (BGA) in which electrodes are arranged on their back surface.

Solder bumps are formed on the BGA electrodes. As a method for making a solder bump, a method of mounting a solder ball on an electrode coated with a flux followed by heating has been adopted. In recent years, with the miniaturization of electronic components, the narrowing of an electrode pitch, which is a soldering site of the electronic components, is progressing. Due to the narrowing of the electrode pitch, the diameter of the solder balls mounted on the electrodes is also becoming smaller.

In soldering using solder balls, there is presented a problem that, if solder wettability cannot be ensured, the solder does not wet-spread evenly over the electrodes, and that the positions of the solder balls are displaced with respect to the electrodes, thereby giving rise to a state where the solder balls come off from the electrode pad (ball missing) (for example, see Japanese Patent No. 6160788). Such a problem becomes remarkable due to the narrowing of the electrode pitch.

When soldering is performed, it is required that molten solder should be sufficiently wet-spread, and thus the flux is required to have activity capable of removing a metal oxide film.

However, a general organic acid to be added to the flux as the activator merely provides insufficient activity. When the amount of the organic acid to be added is small, wettability cannot be ensured. When the amount of the organic acid to be added is increased to ensure wettability, the residue amount becomes large.

When the residue amount increases, the flux may become unsuitable for non-washing applications in which residues after soldering are not washed for use. Thus, a flux with low residue is required.

Accordingly, in applications in which the residues after soldering are not washed for use, it is preferable that sufficient activity be obtained even with a small amount of a component that functions as an activator. In particular, the solder balls become smaller in diameter with narrowing of the electrode pitch. Furthermore, when the solder balls are miniaturized to a size called solder powder, activity is required by the flux.

The present invention has been made to solve such problems, and an object thereof is to provide a flux which can ensure the wettability of solder, and have a low residue amount after soldering so that it can be applied to applications in which residues after soldering are not washed for use, and a solder paste using this flux.

Dimer acid which is a reaction product of oleic acid and linoleic acid and its hydrogenated product, and trimer acid which is a reaction product of oleic acid and linoleic acid and its hydrogenated product have been found to provide sufficient activity even when added in a small amount.

The present invention is a flux containing: 1 wt % or more and 13 wt % or less of any one of dimer acid which is a reaction product of oleic acid and linoleic acid, trimer acid which is a reaction product of oleic acid and linoleic acid, hydrogenated dimer acid obtained by adding hydrogen to (hydrogenating) the dimer acid which is a reaction product of oleic acid and linoleic acid, and hydrogenated trimer acid obtained by adding hydrogen to (hydrogenating) the trimer acid which is a reaction product of oleic acid and linoleic acid, or, in total, of two or more of dimer acid which is a reaction product of oleic acid and linoleic acid, trimer acid which is a reaction product of oleic acid and linoleic acid, hydrogenated dimer acid obtained by adding hydrogen to (hydrogenating) the dimer acid which is a reaction product of oleic acid and linoleic acid, and hydrogenated trimer acid obtained by adding hydrogen to (hydrogenating) the trimer acid which is a reaction product of oleic acid and linoleic acid; and 65 wt % or more and 99 wt % or less of a solvent.

The flux of the present invention preferably contains 85 wt % or more and 95 wt % or less of the solvent, and further preferably contains 0 wt % or more and 5 wt % or less of a different organic acid. Furthermore, although the flux may contain 0 wt % or more and 10.0 wt % or less of rosin, it is preferable that the flux be free of rosin.

The flux of the present invention preferably further contains 0 wt % or more and 5 wt % or less of an amine, 0 wt % or more and 5 wt % or less an organohalogen compound, and 0 wt % or more and 1 wt % or less of an amine hydrohalide.

The flux of the present invention preferably further contains at least one of a base material, a surfactant, a thixotropic agent, and an antioxidant.

Further, the flux of the present invention is preferably such that a weight after 10 mg of the flux is heated up to from 25° C. to 250° C. at a temperature rising rate of 1° C./sec in an $N_2$ atmosphere is 15% or less of the weight before heating.

Moreover, the present invention is a solder paste including the flux described above and metal powder.

In the present invention, the flux contains: 1 wt % or more and 13 wt % or less of any one of dimer acid which is a reaction product of oleic acid and linoleic acid, trimer acid which is a reaction product of oleic acid and linoleic acid, hydrogenated dimer acid obtained by adding hydrogen to (hydrogenating) the dimer acid which is a reaction product of oleic acid and linoleic acid, and hydrogenated trimer acid obtained by adding hydrogen to (hydrogenating) the trimer acid which is a reaction product of oleic acid and linoleic acid, or, in total, of two or more of dimer acid which is a reaction product of oleic acid and linoleic acid, trimer acid which is a reaction product of oleic acid and linoleic acid, hydrogenated dimer acid obtained by adding hydrogen to (hydrogenating) the dimer acid which is a reaction product of oleic acid and linoleic acid, and hydrogenated trimer acid obtained by adding hydrogen to (hydrogenating) the trimer acid which is a reaction product of oleic acid and linoleic acid. Thus, the solder wettability can be obtained. Moreover, it is possible to suppress the residue amount to realize low residue, and to use the flux in non-washing applications.

The flux of the present embodiment contains: 1 wt % or more and 13 wt % or less of any one of dimer acid which is a reaction product of oleic acid and linoleic acid, trimer acid which is a reaction product of oleic acid and linoleic acid, hydrogenated dimer acid obtained by adding hydrogen to (hydrogenating) the dimer acid which is a reaction product of oleic acid and linoleic acid, and hydrogenated trimer acid obtained by adding hydrogen to (hydrogenating) the trimer acid which is a reaction product of oleic acid and linoleic acid, or, in total, of two or more of dimer acid which is a reaction product of oleic acid and linoleic acid, trimer acid which is a reaction product of oleic acid and linoleic acid, hydrogenated dimer acid obtained by adding hydrogen to (hydrogenating) the dimer acid which is a reaction product of oleic acid and linoleic acid, and hydrogenated trimer acid obtained by adding hydrogen to (hydrogenating) the trimer acid which is a reaction product of oleic acid and linoleic acid; and 65 wt % or more and 99 wt % or less of a solvent.

The dimer acid of the present embodiment is a reaction product of oleic acid and linoleic acid, which is a dimer with 36 carbon atoms. The trimer acid of the present embodiment is a reaction product of oleic acid and linoleic acid, which is a trimer with 54 carbon atoms. The dimer acid and trimer acid of the present embodiment, which are reaction products of oleic acid and linoleic acid, have heat resistance to heating up to a temperature range assumed for soldering, and function as activators during soldering.

When considering two fluxes to which dimer acid with 36 carbon atoms which is a reaction product of oleic acid and linoleic acid and its hydrogenated product and an organic acid with a smaller number of carbon atoms than that in the dimer acid which is a reaction product of oleic acid and linoleic acid and its hydrogenated product are added in equal amounts, the dimer acid which is a reaction product of oleic acid and linoleic acid and its hydrogenated product have a higher molecular weight, and have a smaller acid value even when added in an equal amount. For this reason, the organic acid having a smaller number of carbon atoms provides higher oxide film removal (rate) activity. However, if all the components are configured to be easily volatilized in order to realize a low residue flux, the organic acid would also be designed to volatilize during reflow, and the flux cannot be protected by a heat-resistant component such as a rosin. Therefore, especially an organic acid having a small number of carbon atoms would volatilize and decompose.

In contrast, dimer acid which is a reaction product of oleic acid and linoleic acid and its hydrogenated product have a high molecular weight, heat resistance, and activity in a relatively small amount, and thus solder wettability is improved. The same applies to the trimer acid with 54 carbon atoms which is a reaction product of oleic acid and linoleic acid and its hydrogenated product.

As a result, the dimer acid which is a reaction product of oleic acid and linoleic acid and its hydrogenated product and the trimer acid which is a reaction product of oleic acid and linoleic acid and its hydrogenated product function as activators during soldering even when the amount thereof contained in the flux is small. Further, since the amount of the respective acids in the flux is small, it is possible to suppress the residue amount after soldering to realize low residue, and also to use the flux in applications in which the residues after soldering are not washed for use.

When dimer acid which is a reaction product of oleic acid and linoleic acid, trimer acid which is a reaction product of oleic acid and linoleic acid, hydrogenated dimer acid obtained by adding hydrogen to (hydrogenating) the dimer acid which is a reaction product of oleic acid and linoleic acid, or hydrogenated trimer acid obtained by adding hydrogen to (hydrogenating) the trimer acid which is a reaction product of oleic acid and linoleic acid is added in a large amount, the residue amount after soldering is increased.

Thus, the flux of the present embodiment contains: 1 wt % or more and 13 wt % or less of any one of dimer acid which is a reaction product of oleic acid and linoleic acid, trimer acid which is a reaction product of oleic acid and linoleic acid, hydrogenated dimer acid obtained by adding hydrogen to (hydrogenating) the dimer acid which is a reaction product of oleic acid and linoleic acid, and hydrogenated trimer acid obtained by adding hydrogen to (hydrogenating) the trimer acid which is a reaction product of oleic acid and linoleic acid, or, in total, two or more of dimer acid which is a reaction product of oleic acid and linoleic acid, trimer acid which is a reaction product of oleic acid and linoleic acid, hydrogenated dimer acid obtained by adding hydrogen to (hydrogenating) the dimer acid which is a reaction product of oleic acid and linoleic acid, and hydrogenated trimer acid obtained by adding hydrogen to (hydrogenating) the trimer acid which is a reaction product of oleic acid and linoleic acid.

Further, the flux of the present embodiment contains 65 wt % or more and 99 wt % or less, more preferably 85 wt % or more and 95 wt % or less of the solvent.

In addition, the flux of the present embodiment further contains 0 wt % or more and 5 wt % or less of a different organic acid as an activator. The flux of the present embodiment further contains 0 wt % or more and 10.0 wt % or less of rosin. Note that the flux is preferably free of rosin.

In addition, the flux of the present embodiment further contains 0 wt % or more and 5 wt % or less of an amine, 0 wt % or more and 5 wt % or less of an organohalogen compound, and 0 wt % or more and/or 1 wt % or less of an amine hydrohalide as activator(s).

Note that the flux of the present embodiment may contain at least one of a base material, a surfactant, a thixotropic agent, and an antioxidant as an additive.

The flux of the present embodiment is preferably such that the weight after 10 mg of the flux is heated up to from 25° C. to 250° C. at a temperature rising rate of 1° C./sec in an $N_2$ atmosphere is 15% or less of the weight before heating, as measured by thermogravimetry. When the weight after heating is 15% or less of the weight before heating, the flux can be regarded as a low residue flux that can be used in non-washing applications. The weight after heating is more preferably 10% or less of the weight before heating, more preferably 5% or less of the weight before heating.

Examples of the solvent include water, alcohol solvents, glycol ether solvents, and terpineols. Examples of the alcohol solvents include ethanol, industrial ethanol (mixed solvent obtained by adding methanol and/or isopropyl alcohol to ethanol), isopropyl alcohol, 1,2-butanediol, isobornyl cyclohexanol, 2,4-diethyl-1,5-pentanediol, 2,2-dimethyl-1,3-propanediol, 2,5-dimethyl-2,5-hexanediol, 2,5-dimethyl-3-hexyne-2,5-diol, 2,3-dimethyl-2,3-butanediol, 1,1,1-tris (hydroxymethyl)ethane, 2-ethyl-2-hydroxymethyl-1,3-propanediol, 2,2'-oxybis(methylene)bis(2-ethyl-1,3-propanediol), 2,2-bis(hydroxymethyl)-1,3-propanediol, 1,2,6-trihydroxyhexane, bis[2,2,2-tris(hydroxymethyl)ethyl] ether, 1-ethynyl-1-cyclohexanol, 1,4-cyclohexanediol, 1,4-cyclohexanedimethanol, erythritol, threitol, guaiacol glycerol ether, 3,6-dimethyl-4-octin-3,6-diol, and 2,4,7,9-tetramethyl-5-decyne-4,7-diol. Examples of the glycol ether solvents include hexyl diglycol, diethylene glycol mono-2-ethyl hexyl ether, ethylene glycol monophenyl ether, 2-methylpentane-2,4-diol, diethylene glycol dibutyl ether, and triethylene glycol monobutyl ether. Among these solvents, the flux preferably contains a solvent having a high viscosity at room temperature, such as isobornyl cyclohexanol and 2,4-diethyl-1,5-pentanediol.

Examples of the different organic acids include glutaric acid, adipic acid, azelaic acid, eicosane diacid, citric acid, glycolic acid, succinic acid, salicylic acid, diglycolic acid, dipicolinic acid, dibutyl aniline diglycolic acid, suberic acid, sebacic acid, thioglycol acid, phthalic acid, isophthalic acid, terephthalic acid, dodecanedioic acid, parahydroxyphenylacetic acid, picolinic acid, phenylsuccinic acid, fumaric acid, maleic acid, malonic acid, lauric acid, benzoic acid, tartaric acid, tris(2-carboxyethyl)isocyanurate, glycine, 1,3-cyclohexanedicarboxylic acid, 2,2-bis(hydroxymethyl)propionicacid, 2,2-bis(hydroxymethyl)butanoic acid, 4-tert-butylbenzoic acid, 2,3-dihydroxybenzoic acid, 2,4-diethyl glutaric acid, 2-quinolinecarboxylic acid, 3-hydroxybenzoic acid, malic acid, p-anisic acid, palmitic acid, stearic acid, 12-hydroxystearic acid, oleic acid, linoleic acid, and linolenic acid.

Further, examples of the different organic acid include, as dimer acid other than a reaction product of oleic acid and linoleic acid, trimer acid other than a reaction product of oleic acid and linoleic acid, hydrogenated dimer acid obtained by adding hydrogen to (hydrogenating) the dimer acid other than a reaction product of oleic acid and linoleic acid or hydrogenated trimer acid obtained by adding hydrogen to (hydrogenating) the trimer acid other than a reaction product of oleic acid and linoleic acid: dimer acid which is a reaction product of acrylic acid, trimer acid which is a reaction product of acrylic acid, dimer acid which is a reaction product of methacrylic acid, trimer acid which is a reaction product of methacrylic acid, dimer acid which is a reaction product of acrylic acid and methacrylic acid, trimer acid which is a reaction product of acrylic acid and methacrylic acid, dimer acid which is a reaction product of oleic acid, trimer acid which is a reaction product of oleic acid, dimer acid which is a reaction product of linoleic acid, trimer acid which is a reaction product of linoleic acid, dimer acid which is a reaction product of linolenic acid, trimer acid which is a reaction product of linolenic acid, dimer acid which is a reaction product of acrylic acid and oleic acid, trimer acid which is a reaction product of acrylic acid and oleic acid, dimer acid which is a reaction product of acrylic acid and linoleic acid, trimer acid which is a reaction product of acrylic acid and linoleic acid, dimer acid which is a reaction product of acrylic acid and linolenic acid, trimer acid which is a reaction product of acrylic acid and linolenic acid, dimer acid which is a reaction product of methacrylic acid and oleic acid, trimer acid which is a reaction product of methacrylic acid and oleic acid, dimer acid which is a reaction product of methacrylic acid and linoleic acid, trimer acid which is a reaction product of methacrylic acid and linoleic acid, dimer acid which is a reaction product of methacrylic acid and linolenic acid, trimer acid which is a reaction product of methacrylic acid and linolenic acid, dimer acid which is a reaction product of oleic acid and linolenic acid, trimer acid which is a reaction product of oleic acid and linolenic acid, dimer acid which is a reaction product of linoleic acid and linolenic acid, trimer acid which is a reaction product of linoleic acid and linolenic acid, hydrogenated dimer acid obtained by adding hydrogen to (hydrogenating) dimer acid other than the reaction product of oleic acid and linoleic acid indicated above, and hydrogenated trimer acid obtained by adding hydrogen to (hydrogenating) trimer acid other than the reaction product of oleic acid and linoleic acid indicated above.

Examples of the rosin include raw material rosins such as gum rosin, wood rosin, and tall oil rosin, and derivatives obtained from the raw material rosins. Examples of the derivatives include purified rosins, hydrogenated rosins, disproportionated rosins, polymerized rosins, acid modified rosins, phenol modified rosins, and α,β unsaturated carboxylic acid modified products (acrylated rosins, maleated rosins, fumarated rosins, and the like); purified products, hydrides, and disproportionated products of the polymerized rosins; and purified products, hydrides, and disproportionated products of the α,β-unsaturated carboxylic acid modified products. One or two or more of these can be used.

The flux of the present embodiment may further contain a different resin in addition to rosin. The flux can further contain, as the different resin, at least one resin selected from terpene resin, modified terpene resin, terpene phenol resin, modified terpene phenol resin, styrene resin, modified styrene resin, xylene resin, and modified xylene resin. As the modified terpene resin, aromatic modified terpene resin, hydrogenated terpene resin, hydrogenated aromatic modified terpene resin or the like can be used. As the modified terpene phenol resin, a hydrogenated terpene phenol resin or the like can be used. As the modified styrene resin, a styrene acrylic resin, a styrene maleic acid resin, or the like can be used. As the modified xylene resin, there can be used a phenol-modified xylene resin, an alkylphenol-modified xylene resin, a phenol-modified resole-type xylene resin, a polyol-modified xylene resin, a polyoxyethylene-added xylene resin, and the like. When the total amount of rosin is 100, the amount of the different resin is preferably 40 wt % or less, more preferably 20 wt % or less.

Examples of the amine include monoethanolamine, diphenylguanidine, ethylamine, triethylamine, ethylenediamine, triethylenetetramine, 2-methylimidazole, 2-undecylimidazole, 2-heptadecylimidazole, 1,2-dimethylimidazole, 2-ethyl-4-methylimidazole, 2-phenylimidazole, 2-phenyl-4-methylimidazole, 1-benzyl-2-methylimidazole, 1-benzyl-2-phenylimidazole, 1-cyanoethyl-2-methylimidazole, 1-cyanoethyl-2-undecylimidazole, 1-cyanoethyl-2-ethyl-4-methylimidazole, 1-cyanoethyl-2-phenylimidazole, 1-cyanoethyl-2-undecylimidazolium trimellitate, 1-cyanoethyl-2-phenylimidazolium trimellitate, 2,4-diamino-6-[2'-methylimidazolyl-(1')]-ethyl-s-triazine, 2,4-diamino-6-[2'-undecylimidazolyl-(1')]-ethyl-s-triazine, 2,4-diamino-6-[2'-ethyl-4'-methylimidazolyl-(1')]-ethyl-s-triazine, 2,4-diamino-6-[2'-methylimidazolyl-(1')]-ethyl-s-triazine isocyanuric acid adduct, 2-phenylimidazole isocyanuric acid adduct, 2-phenyl-4,5-dihydroxymethylimidazole, 2-phenyl-4-methyl-5-hydroxymethylimidazole, 2,3-dihydro-1H-pyrrolo[1,2-a]benzimidazole, 1-dodecyl-2-methyl-3-benzylimidazolium chloride, 2-methylimidazoline, 2-phenylimidazoline, 2,4-diamino-6-vinyl-s-triazine, 2,4-diamino-6-vinyl-s-triazine isocyanuric acid adduct, 2,4-diamino-6-methacryloyloxyethyl-s-triazine, epoxy-imidazole adduct, 2-methylbenzimidazole, 2-octylbenzimidazole, 2-pentylbenzimidazole, 2-(1-ethylpentyl)benzimidazole, 2-nonylbenzimidazole, 2-(4-thiazolyl)benzimidazole, benzimidazole, 2-(2'-hydroxy-5'-methylphenyl)benzotriazole, 2-(2'-hydroxy-3'-tert-butyl-5'-methylphenyl)-5-chlorobenzotriazole, 2-(2'-hydroxy-3',5'-di-tert-amylphenyl)benzotriazole, 2-(2'-hydroxy-5'-tert-octylphenyl)benzotriazole, 2,2'-methylenebis[6-(2H-benzotriazol-2-yl)-4-tert-octylphenol], 6-(2-benzotriazolyl)-4-tert-octyl-6'-tert-butyl-4'-methyl-2,2'-methylene bisphenol, 1,2,3-benzotriazole, 1-[N,N-bis(2-ethylhexyl)aminomethyl]benzotriazole, carboxybenzotriazole, 1-[N,N-bis(2-ethylhexyl)aminomethyl]methyl benzotriazole, 2,2'-[[(methyl-1H-benzotriazol-1-yl)methyl] imino]bisethanol, 1-(1',2'-dicarboxyethyl)benzotriazole, 1-(2,3-dicarboxypropyl)benzotriazole, 1-[(2-ethylhexylamino) methyl]benzotriazole, 2,6-bis[(1H-benzotriazol-1-yl)methyl]-4-methylphenol, 5-methyl benzotriazole, and 5-phenyltetrazole.

Examples of the organohalogen compound include organic bromo compounds such as trans-2,3-dibromo-1,4-butenediol, triallyl isocyanurate hexabromide, 1-bromo-2-butanol, 1-bromo-2-propanol, 3-bromo-1-propanol, 3-bromo-1,2-propanediol, 1,4-dibromo-2-butanol, 1,3-dibromo-2-propanol, 2,3-dibromo-1-propanol, 2,3-dibromo-1,4-butanediol, 2,3-dibromo-2-butene-1,4-diol, trans-2,3-dibromo-2-butene-1,4-diol, cis-2,3-dibromo-2-butene-1,4-diol, tetrabromophthalic acid, and bromosuccinic acid. Moreover, there are listed: organic chloro compounds including chloroalkane, chlorinated fatty acid ester, het acid, and het anhydride.

The amine hydrohalide is a compound obtained by causing an amine and hydrogen halide to react, and examples thereof include aniline hydrochloride and aniline hydrobromide. As the amine of the amine hydrohalide, the above-described amines can be used, and examples thereof include ethylamine, ethylenediamine, triethylamine, methylimidazole, and 2-ethyl-4-methylimidazole. Examples of the hydrogen halide include hydrides of chlorine, bromine, iodine, and fluorine (hydrogen chloride, hydrogen bromide, hydrogen iodide, and hydrogen fluoride). Moreover, a borofluoride may be contained in place of or in combination with the amine hydrohalide, and examples of the borofluoride include fluoroboric acid.

Examples of the thixotropic agent include wax-based thixotropic agents and amide-based thixotropic agents. Examples of such wax-based thixotropic agents include hydrogenated castor oil. Examples of the amide-based thixotropic agents include lauric acid amide, palmitic acid amide, stearic acid amide, behenic acid amide, hydroxystearic acid amide, saturated fatty acid amide, oleic acid amide, erucic acid amide, unsaturated fatty acid amide, p-toluenemethaneamide, aromatic amide, methylene bisstearic acid amide, ethylene bislauric acid amide, ethylene bishydroxystearic acid amide, saturated fatty acid bisamides, methylene bisoleic acid amide, unsaturated fatty acid bisamides, m-xylylene bisstearic acid amides, aromatic bisamides, saturated fatty acid polyamide, unsaturated fatty acid polyamide, aromatic polyamide, substituted amide, methylol stearic acid amide, methylol amide, and fatty acid ester amide.

Examples of the base agent include polyethylene glycol. Examples of the surfactant include hydroxypropylated ethylenediamine, polyoxypropylene ethylenediamine, ethylenediaminetetrapolyoxyethylene polyoxypropylene, polyoxyethylene alkylamine, polyoxyethylene alkyl ether, and polyoxyethylene alkylamide. Examples of the antioxidant include hindered phenolic antioxidants.

Example of Solder Paste of Present Embodiment

A solder paste of the present embodiment includes the above-described flux and metal powder. The metal powder is preferably Pb-free solder, and contains solder powder containing: Sn metal; Sn—Ag, Sn—Cu, Sn—Ag—Cu, Sn—Bi, Sn—In, or the like; or a product obtained by adding Sb, Bi, In, Cu, Zn, As, Ag, Cd, Fe, Ni, Co, Au, Ge, P, or the like to any of these alloys.

Action/Effect Example of Flux and Solder Paste of Present Embodiment

The flux containing: 1 wt % or more and 13 wt % or less of any one of dimer acid which is a reaction product of oleic acid and linoleic acid, trimer acid which is a reaction product of oleic acid and linoleic acid, hydrogenated dimer acid obtained by adding hydrogen to (hydrogenating) the dimer acid which is a reaction product of oleic acid and linoleic acid, and hydrogenated trimer acid obtained by adding hydrogen to (hydrogenating) the trimer acid which is a reaction product of oleic acid and linoleic acid, or, in total, of two or more of dimer acid which is a reaction product of oleic acid and linoleic acid, trimer acid which is a reaction product of oleic acid and linoleic acid, hydrogenated dimer acid obtained by adding hydrogen to (hydrogenating) the dimer acid which is a reaction product of oleic acid and linoleic acid, and hydrogenated trimer acid obtained by adding hydrogen to (hydrogenating) the trimer acid which is a reaction product of oleic acid and linoleic acid and the solder paste using this flux can provide solder wettability. Further, it is possible to suppress the residue amount to realize low residue.

When a solder bump is formed by applying the flux of the present embodiment to an electrode and placing a solder ball on the electrode to which the flux has been applied, the solder is wet-spread evenly, thereby suppressing the displacement of the solder ball relative to the electrode. Thus, the occurrence of ball missing can be suppressed.

EXECUTED EXAMPLES

Fluxes of Executed Examples and Comparison Examples were prepared with the compositions shown in Tables 1 and 2 below to verify the solder wet spreadability and the residue amount. The composition rates in Tables 1 and 2 are expressed in wt (weight) % when the total amount of each flux is 100.

<Evaluation of Solder Wet Spreadability>

(1) Verification Method

Each of the fluxes of the Executed Examples and the Comparison Examples was printed on a Cu plate with a diameter φ of 0.34 mm and a thickness t=0.2 mm. Then, solder balls made of solder containing 3 wt % of Ag, 0.5 wt % of Cu, and the balance Sn (Sn-3Ag-0.5Cu) were mounted. The solder balls each have a diameter φ of 0.3 mm. The number of targets to be evaluated is 50 in each Executed Example and each Comparison Example. The test objects made as described above were heated up to from 25° C. to 250° C. in a $N_2$ atmosphere at a temperature rising rate of 5° C./sec using a reflow furnace. Then, the wet spreading diameter of the molten solder was measured.

(2) Criterion for Determination

○: The wet spreading diameter was 350 μm or more.

x: The wet spreading diameter was less than 350 μm.

<Evaluation of Residue Amount>

(1) Verification Method

As a test evaluation method by the TG method (thermogravimetry), an aluminum pan was filled with 10 mg of each of the fluxes of Executed Examples and Comparison Examples, and TGD9600 manufactured by ULVAC was used for heating up to from 25° C. to 250° C. in a $N_2$ atmosphere at a temperature rising rate of 1° C./sec. It was measured whether the weight of each of the fluxes after heating arrived at 15% or less of the weight before heating.

(2) Criterion for Determination

○: The weight was 15% or less of the weight before heating.

×: The weight was greater than 15% of the weight before heating.

The flux whose weight after heating is 15% or less of the weight before heating can be said to be a flux that does not require washing after reflow because the components in the flux are sufficiently volatilized by heating. It can be said that, in the flux whose weight was greater than 15% of the weight before heating, the components in the flux were insufficiently volatilized. If the components in the flux are insufficiently volatilized, resulting in a large amount of residues, it may cause poor conductivity due to moisture absorption or the like.

<Comprehensive Evaluation>

○: All of the wet spreading evaluation and the residue amount evaluation were ○.

×: Either or both of the wet spreading evaluation and the residue amount evaluation was/were ×.

TABLE 1

| | Material | | Number of carbon atoms | Executed Example 1 | Executed Example 2 | Executed Example 3 | Executed Example 4 | Executed Example 5 | Executed Example 6 |
|---|---|---|---|---|---|---|---|---|---|
| Organic acid | Dimer which is reaction product of oleic acid and linoleic acid | Dimer acid | 36 | 5 | | | | 2.5 | |
| | | Hydrogenated dimer acid | 36 | | 5 | | | | 2.5 |
| | Trimer which is reaction product of oleic acid and linoleic acid | Trimer acid | 54 | | | 5 | | 2.5 | |
| | | Hydrogenated trimer acid | 54 | | | | 5 | | 2.5 |
| | Different organic acid | Malonic acid | 3 | | | | | | |
| | | Succinic acid | 4 | | | | | | |
| | | Glutaric acid | 5 | | | | | | |
| | | Adipic acid | 12 | | | | | | |
| | Rosin | Hydrogenated rosin | — | | | | | | |
| | Amine | 2-Phenylimidazole | — | | | | | | |
| Halogen | Amine hydrohalide | Diphenylguanidine-HBr | — | | | | | | |
| | Organohalogen compound | Trans-2,3-dibromo-2-butene-1,4-diol | — | | | | | | |
| | Solvent | Isobornyl cyclohexanol | — | 75 | 75 | 75 | 75 | 75 | 75 |
| | | 2,4-Diethyl-1,5-pentanediol | — | | | | | | |
| | | 1,3-Butylene glycol | — | 20 | 20 | 20 | 20 | 20 | 20 |
| | Wet spreading evaluation | | | ○ | ○ | ○ | ○ | ○ | ○ |
| | Residue amount evaluation | | | ○ | ○ | ○ | ○ | ○ | ○ |
| | Comprehensive evaluation | | | ○ | ○ | ○ | ○ | ○ | ○ |

| | Material | | Number of carbon atoms | Executed Example 7 | Executed Example 8 | Executed Example 9 | Executed Example 10 |
|---|---|---|---|---|---|---|---|
| Organic acid | Dimer which is reaction product of oleic acid and linoleic acid | Dimer acid | 36 | 5 | 13 | 5 | 5 |
| | | Hydrogenated dimer acid | 36 | | | | |
| | Trimer which is reaction product of oleic acid and linoleic acid | Trimer acid | 54 | | | | |
| | | Hydrogenated trimer acid | 54 | | | | |
| | Different organic acid | Malonic acid | 3 | | | 5 | |
| | | Succinic acid | 4 | | | | 5 |
| | | Glutaric acid | 5 | | | | |
| | | Adipic acid | 12 | | | | |
| | Rosin | Hydrogenated rosin | — | | | | |
| | Amine | 2-Phenylimidazole | — | | | | |
| Halogen | Amine hydrohalide | Diphenylguanidine-HBr | — | | | | |
| | Organohalogen compound | Trans-2,3-dibromo-2-butene-1,4-diol | — | | | | |
| | Solvent | Isobornyl cyclohexanol | — | | 67 | 70 | 70 |
| | | 2,4-Diethyl-1,5-pentanediol | — | 75 | | | |
| | | 1,3-Butylene glycol | — | 20 | 20 | 20 | 20 |
| | Wet spreading evaluation | | | ○ | ○ | ○ | ○ |
| | Residue amount evaluation | | | ○ | ○ | ○ | ○ |
| | Comprehensive evaluation | | | ○ | ○ | ○ | ○ |

TABLE 2

| Material | | | Number of carbon atoms | Executed Example 11 | Executed Example 12 | Executed Example 13 | Executed Example 14 | Executed Example 15 |
|---|---|---|---|---|---|---|---|---|
| Organic acid | Dimer which is reaction product of oleic acid and linoleic acid | Dimer acid | 36 | 5 | 5 | 5 | 5 | 1 |
| | | Hydrogenated dimer acid | 36 | | | | | |
| | Trimer which is reaction product of oleic acid and linoleic acid | Trimer acid | 54 | | | | | |
| | | Hydrogenated trimer acid | 54 | | | | | |
| | Different organic acid | Malonic acid | 3 | | | | | 5 |
| | | Succinic acid | 4 | | | | | |
| | | Glutaric acid | 5 | 5 | | | | |
| | | Adipic acid | 12 | | 5 | | | |
| | Rosin | Hydrogenated rosin | — | | | 5 | | |
| | Amine | 2-Phenylimidazole | — | | | | 5 | |
| Halogen | Amine hydrohalide | Diphenylguanidine-HBr | — | | | | | 1 |
| | Organohalogen compound | Trans-2,3-dibromo-2-butene-1,4-diol | — | | | | | |
| | Solvent | Isobornyl cyclohexanol | — | 70 | 70 | 70 | 70 | 73 |
| | | 2,4-Diethyl-1,5 pentanediol | — | | | | | |
| | | 1,3-Butylene glycol | — | 20 | 20 | 20 | 20 | 20 |
| | | Wet spreading evaluation | | ○ | ○ | ○ | ○ | ○ |
| | | Residue amount evaluation | | ○ | ○ | ○ | ○ | ○ |
| | | Comprehensive evaluation | | ○ | ○ | ○ | ○ | ○ |

| Material | | | Number of carbon atoms | Executed Example 16 | Executed Example 1 | Executed Example 2 | Executed Example 3 |
|---|---|---|---|---|---|---|---|
| Organic acid | Dimer which is reaction product of oleic acid and linoleic acid | Dimer acid | 36 | 5 | 0 | 10 | 0.1 |
| | | Hydrogenated dimer acid | 36 | | | | |
| | Trimer which is reaction product of oleic acid and linoleic acid | Trimer acid | 54 | | | | |
| | | Hydrogenated trimer acid | 54 | | | | |
| | Different organic acid | Malonic acid | 3 | | 5 | | |
| | | Succinic acid | 4 | | | | |
| | | Glutaric acid | 5 | | | | |
| | | Adipic acid | 12 | | | | |
| | Rosin | Hydrogenated rosin | — | | | 40 | |
| | Amine | 2-Phenylimidazole | — | | | | |
| Halogen | Amine hydrohalide | Diphenylguanidine-HBr | — | | | | |
| | Organohalogen compound | Trans-2,3-dibromo-2-butene-1,4-diol | — | 5 | | | |
| | Solvent | Isobornyl cyclohexanol | — | 70 | 75 | 20 | 79.9 |
| | | 2,4-Diethyl-1,5 pentanediol | — | | | | |
| | | 1,3-Butylene glycol | — | 20 | 20 | 30 | 20 |
| | | Wet spreading evaluation | | ○ | x | ○ | x |
| | | Residue amount evaluation | | ○ | ○ | x | ○ |
| | | Comprehensive evaluation | | ○ | x | x | x |

The fluxes of the Executed Examples and the Comparison Examples were verified. The flux containing dimer acid with 36 carbon atoms which was a reaction product of oleic acid and linoleic acid in an amount of 5 wt % which fell within the range defined in the present invention; and isobornyl cyclohexanol in an amount of 75 wt % and 1,3-butylene glycol in an amount of 20 wt % as solvents, the total amount of the solvents being 95 wt % which fell within the range defined in the present invention, as indicated in Executed Example 1, provided a solder wet spreading diameter of 350 µm or more and good solder wet spreading, so that a sufficient solder wet spreading effect was obtained. Also, when the residue amount was 15 wt % or less, a sufficient effect of suppressing the residue amount to attain low residue was obtained. In addition, due to the inclusion of isobornyl cyclohexanol as a solvent, the viscosity of the flux at normal temperature before heating could be increased to such an extent that the solder balls can be retained.

Also, the flux containing hydrogenated dimer acid obtained by adding hydrogen to (hydrogenating) dimer acid with 36 carbon atoms which was a reaction product of oleic acid and linoleic acid, in an amount of 5 wt % which fell within the range defined in the present invention; and isobornyl cyclohexanol in an amount of 75 wt % and 1,3-butylene glycol in an amount of 20 wt % as solvents, the total amount of the solvents being 95 wt % which fell within the range defined in the present invention, as indicated in Executed Example 2, provided a sufficient solder wet spreading effect. Further, a sufficient effect of suppressing the residue amount to attain low residue was obtained.

Also, the flux containing trimer acid with 54 carbon atoms which was a reaction product of oleic acid and linoleic acid in an amount of 5 wt % which fell within the range defined in the present invention; and isobornyl cyclohexanol in an amount of 75 wt % and 1,3-butylene glycol in an amount of 20 wt % as solvents, the total amount of the solvents being 95 wt % which fell within the range defined in the present invention, as indicated in Executed Example 3, provided a sufficient solder wet spreading effect. Further, a sufficient effect of suppressing the residue amount to attain low residue was obtained.

Also, the flux containing hydrogenated trimer acid obtained by adding hydrogen to (hydrogenating) trimer acid with 54 carbon atoms which was a reaction product of oleic acid and linoleic acid in an amount of 5 wt % which fell within the range defined in the present invention; and isobornyl cyclohexanol in an amount of 75 wt % and 1,3-butylene glycol in an amount of 20 wt % as solvents, the total amount of the solvents being 95 wt % which fell within the range defined in the present invention, as indicated in Executed Example 4, provided a sufficient solder wet spreading effect. Further, a sufficient effect of suppressing the residue amount to attain low residue was obtained.

Also, the flux containing dimer acid with 36 carbon atoms which was a reaction product of oleic acid and linoleic acid in an amount of 2.5 wt % and trimer acid with 54 carbon atoms which was a reaction product of oleic acid and linoleic acid in an amount of 2.5 wt %, the total amount of the dimer acid and the trimer acid being 5 wt % which fell within the range defined in the present invention; and isobornyl cyclohexanol in an amount of 75 wt % and 1,3-butylene glycol in an amount of 20 wt % as solvents, the total amount of the solvents being 95 wt % which fell within the range defined in the present invention, as indicated in Executed Example 5, provided a sufficient solder wet spreading effect. Further, a sufficient effect of suppressing the residue amount to attain low residue was obtained.

Also, the flux containing hydrogenated dimer acid obtained by adding hydrogen to (hydrogenating) dimer acid with 36 carbon atoms which was a reaction product of oleic acid and linoleic acid in an amount of 2.5 wt % and hydrogenated trimer acid obtained by adding hydrogen to (hydrogenating) trimer acid with 54 carbon atoms which was a reaction product of oleic acid and linoleic acid in an amount of 2.5 wt %, the total amount of the hydrogenated dimer acid and the hydrogenated trimer acid being 5 wt % which fell within the range defined in the present invention; and isobornyl cyclohexanol in an amount of 75 wt % and 1,3-butylene glycol in an amount of 20 wt % as solvents, the total amount of the solvents being 95 wt % which fell within the range defined in the present invention, as indicated in Executed Example 6, provided a sufficient solder wet spreading effect. Further, a sufficient effect of suppressing the residue amount to attain low residue was obtained.

Also, the flux containing dimer acid with 36 carbon atoms which was a reaction product of oleic acid and linoleic acid in an amount of 5 wt % which fell within the range defined in the present invention; and 2,4-diethyl-1,5-pentanediol in an amount of 75 wt % and 1,3-butylene glycol in an amount of 20 wt % as solvents, the total amount of the solvents being 95 wt % which fell within the range defined in the present invention, as indicated in Executed Example 7, provided a sufficient solder wet spreading effect. Further, a sufficient effect of suppressing the residue amount to attain low residue was obtained. In addition, due to the inclusion of 2,4-diethyl-1,5-pentanediol as a solvent, the viscosity of the flux at normal temperature before heating could be increased to such an extent that the solder balls can be retained.

Also, the flux containing dimer acid with 36 carbon atoms which was a reaction product of oleic acid and linoleic acid, in an amount of 13 wt % which fell within the range defined in the present invention; and isobornyl cyclohexanol in an amount of 67 wt % and 1,3-butylene glycol in an amount of 20 wt % as solvents, the total amount of the solvents being 87 wt % which fell within the range defined in the present invention, as indicated in Executed Example 8, provided a sufficient solder wet spreading effect. Further, a sufficient effect of suppressing the residue amount to attain low residue was obtained.

Also, the flux containing dimer acid with 36 carbon atoms which was a reaction product of oleic acid and linoleic acid in an amount of 5 wt % which fell within the range defined in the present invention; further malonic acid with 3 carbon atoms in an amount of 5 wt % which fell within the range defined in the present invention as an organic acid; and isobornyl cyclohexanol in an amount of 70 wt % and 1,3-butylene glycol in an amount of 20 wt % as solvents, the total amount of the solvents being 90 wt % which fell within the range defined in the present invention, as indicated in Executed Example 9, provided a sufficient solder wet spreading effect. Further, a sufficient effect of suppressing the residue amount to attain low residue was obtained.

Also, the flux containing dimer acid with 36 carbon atoms which was a reaction product of oleic acid and linoleic acid in an amount of 5 wt % which fell within the range defined in the present invention; further succinic acid with 4 carbon atoms in an amount of 5 wt % which fell within the range defined in the present invention as an organic acid; and isobornyl cyclohexanol in an amount of 70 wt % and 1,3-butylene glycol in an amount of 20 wt % as solvents, the total amount of the solvents being 90 wt % which fell within the range defined in the present invention, as indicated in Executed Example 10, provided a sufficient solder wet spreading effect. Further, a sufficient effect of suppressing the residue amount to attain low residue was obtained.

Also, the flux containing dimer acid with 36 carbon atoms which was a reaction product of oleic acid and linoleic acid in an amount of 5 wt % which fell within the range defined in the present invention; further glutaric acid with 5 carbon atoms in an amount of 5 wt % which fell within the range defined in the present invention as an organic acid; and isobornyl cyclohexanol in an amount of 70 wt % and 1,3-butylene glycol in an amount of 20 wt % as solvents, the total amount of the solvents being 90 wt % which fell within the range defined in the present invention, as indicated in Executed Example 11, provided a sufficient solder wet spreading effect. Further, a sufficient effect of suppressing the residue amount to attain low residue was obtained.

Also, the flux containing dimer acid with 36 carbon atoms which was a reaction product of oleic acid and linoleic acid in an amount of 5 wt % which fell within the range defined in the present invention; further adipic acid with 12 carbon atoms in an amount of 5 wt % which fell within the range defined in the present invention as an organic acid; and isobornyl cyclohexanol in an amount of 70 wt % and 1,3-butylene glycol in an amount of 20 wt % as solvents, the total amount of the solvents being 90 wt % which fell within the range defined in the present invention, as indicated in Executed Example 12, provided a sufficient solder wet spreading effect. Further, a sufficient effect of suppressing the residue amount to attain low residue was obtained.

Also, the flux containing dimer acid with 36 carbon atoms which was a reaction product of oleic acid and linoleic acid in an amount of 5 wt % which fell within the range defined in the present invention and hydrogenated rosin as rosin in an amount of 5 wt % which fell within the range defined in the present invention; and isobornyl cyclohexanol in an amount of 70 wt % and 1,3-butylene glycol in an amount of 20 wt % as solvents, the total amount of the solvents being 90 wt % which fell within the range defined in the present invention, as indicated in Executed Example 13, provided a sufficient solder wet spreading effect. Further, in the case where the residue amount was 15 wt % or less, even if rosin was contained, a sufficient effect of suppressing the residue amount to attain low residue was obtained.

Also, the flux containing dimer acid with 36 carbon atoms which was a reaction product of oleic acid and linoleic acid in an amount of 5 wt % which fell within the range defined in the present invention and 2-phenylimidazole as an amine in an amount of 5 wt % which fell within the range defined in the present invention; and isobornyl cyclohexanol in an amount of 70 wt % and 1,3-butylene glycol in an amount of 20 wt % as solvents, the total amount of the solvents being 90 wt % which fell within the range defined in the present invention, as indicated in Executed Example 14, provided a sufficient solder wet spreading effect. Further, a sufficient effect of suppressing the residue amount to attain low residue was obtained.

Also, the flux containing dimer acid with 36 carbon atoms which was a reaction product of oleic acid and linoleic acid in an amount of 1 wt % which fell within the range defined in the present invention; further malonic acid with 3 carbon atoms in an amount of 5 wt % which fell within the range defined in the present invention as an organic acid; an amine hydrohalide in an amount of 1 wt % which fell within the range defined in the present invention as a halogen; and isobornyl cyclohexanol in an amount of 73 wt % and 1,3-butylene glycol in an amount of 20 wt % as solvents, the total amount of the solvents being 93 wt % which fell within the range defined in the present invention, as indicated in Executed Example 15, provided a sufficient solder wet spreading effect. Further, a sufficient effect of suppressing the residue amount to attain low residue was obtained.

Also, the flux containing dimer acid with 36 carbon atoms which was a reaction product of oleic acid and linoleic acid in an amount of 5 wt % which fell within the range defined in the present invention; further an organohalogen compound in an amount of 5 wt % which fell within the range defined in the present invention as a halogen; and isobornyl cyclohexanol in an amount of 70 wt % and 1,3-butylene glycol in an amount of 20 wt % as solvents, the total amount of the solvents being 90 wt % which fell within the range defined in the present invention, as indicated in Executed Example 16, provided a sufficient solder wet spreading effect. Further, a sufficient effect of suppressing the residue amount to attain low residue was obtained.

On the other hand, as shown in Comparison Example 1, the flux containing no dimer acid which was a reaction product of oleic acid and linoleic acid, trimer acid which was a reaction product of oleic acid and linoleic acid, hydrogenated dimer acid obtained by adding hydrogen to (hydrogenating) the dimer acid which was a reaction product of oleic acid and linoleic acid or hydrogenated trimer acid obtained by adding hydrogen to (hydrogenating) the trimer acid which was a reaction product of oleic acid and linoleic acid, and containing malonic acid with 3 carbon atoms in an amount of 5 wt % which fell within the range defined in the invention as an organic acid; isobornyl cyclohexanol 75 wt % and 1,3-butylene glycol in an amount of 20 wt % as solvents, the total amount of the solvents being 95 wt % which fell within the range defined in the invention provided a low residue effect. However, even though an organic acid, other than the dimer acid which was a reaction product of oleic acid and linoleic acid, the trimer acid which was a reaction product of oleic acid and linoleic acid, the hydrogenated dimer acid obtained by adding hydrogen to (hydrogenating) the dimer acid which was a reaction product of oleic acid and linoleic acid and the hydrogenated trimer acid obtained by adding hydrogen to (hydrogenating) the trimer acid which was a reaction product of oleic acid and linoleic acid, was contained in the amount which fell within the range defined in the invention, the solder wet spreading diameter was less than 350 μm, and the solder did not wet-spread, so that the solder wet spreading effect was not obtained.

As indicated in Comparison Example 2, even when containing dimer acid which was a reaction product of oleic acid and linoleic acid in an amount of 10 wt % which fell within the range defined in the present invention, the flux containing hydrogenated rosin as rosin in an amount of 40 wt % which fell beyond the range defined in the present invention; and isobornyl cyclohexanol in an amount of 20 wt % and 1,3-butylene glycol in an amount of 30 wt % as solvents, the total amount of the solvents being 50 wt % which fell below the range defined in the present invention, provided a solder wet spreading effect. However, the residue amount exceeded 15 wt % and could not be suppressed, so that the low residue effect was not obtained.

As indicated in Comparison Example 3, even when containing dimer acid which was a reaction product of oleic acid and linoleic acid, the flux containing the dimer acid which was a reaction product of oleic acid and linoleic acid in an amount of 0.1 wt % which fell below the range defined in the present invention; and isobornyl cyclohexanol in an amount of 79.9 wt % and 1,3-butylene glycol in an amount of 20 wt % as solvents, the total amount of the solvents being 99.9 wt % which fell beyond the range defined in the present invention provided a low residue effect. However, the solder wet spreading diameter was less than 350 μm, and the solder did not wet spread, so that the solder wet-spreading effect was not obtained.

In view of the above, the flux containing: 1 wt % or more and 13 wt % or less of any one of dimer acid which is a reaction product of oleic acid and linoleic acid, trimer acid which is a reaction product of oleic acid and linoleic acid, hydrogenated dimer acid obtained by adding hydrogen to (hydrogenating) the dimer acid which is a reaction product of oleic acid and linoleic acid, and hydrogenated trimer acid obtained by adding hydrogen to (hydrogenating) the trimer acid which is a reaction product of oleic acid and linoleic acid, or, in total, of two or more of dimer acid which is a reaction product of oleic acid and linoleic acid, trimer acid which is a reaction product of oleic acid and linoleic acid, hydrogenated dimer acid obtained by adding hydrogen to (hydrogenating) the dimer acid which is a reaction product of oleic acid and linoleic acid, and hydrogenated trimer acid obtained by adding hydrogen to (hydrogenating) the trimer acid which is a reaction product of oleic acid and linoleic acid; and 65 wt % or more and 99 wt % or less of a solvent provided good solder wet spreading. Further, the residue amount was suppressed.

These effects were not inhibited even in the cases of incorporating a different organic acid, an amine, an amine hydrohalide, and an organohalogen compound as activators within the ranges defined in the present invention. Moreover, the effects were not inhibited even in the case of incorporating rosin within the range defined in the present invention.

The invention claimed is:

1. A flux comprising: 1 wt % or more and 13 wt % or less of at least one acid selected from, a trimer acid which is a reaction product of oleic acid and linoleic acid, a hydrogenated dimer acid obtained by hydrogenating a dimer acid which is a reaction product of oleic acid and linoleic acid, and a hydrogenated trimer acid obtained by hydrogenating the trimer acid which is a reaction product of oleic acid and linoleic acid; and 65 wt % or more and 99 wt % or less of a solvent, wherein a weight after 10 mg of the flux is heated from 25° C. to 250° C. at a temperature rising rate of 1° C./sec in an $N_2$ atmosphere is 15% or less of the weight before heating.

2. The flux according to claim 1, comprising 85 wt % or more and 95 wt % or less of a solvent.

3. The flux according to claim 1, further comprising:
0 wt % or more and 5 wt % or less of a different organic acid
0 wt % or more and 10.0 wt % or less of rosin;
0 wt % or more and 5 wt % or less of an amine;
0 wt % or more and 5 wt % or less of an organohalogen compound; and
0 wt % or more and 1 wt % or less of an amine hydrohalide.

4. The flux according to claim 2, further comprising:
0 wt % or more and 5 wt % or less of a different organic acid;
0 wt % or more and 10.0 wt % or less of rosin
0 wt % or more and 5 wt % or less of an organohalogen compound; and
0 wt % or more and 1 wt % or less of an amine hydrohalide.

5. The flux according to claim 1, wherein the flux is free of rosin.

6. The flux according to claim 5, further comprising:
0 wt % or more and 5 wt % or less of a different organic acid;
0 wt % or more and 5 wt % or less of an amine
0 wt % or more and 5 wt % or less of an organohalogen compound; and
0 wt % or more and 1 wt % or less of an amine hydrohalide.

7. The flux according to claim 1, further comprising at least one additional ingredient selected from the group consisting of a base material, a surfactant, a thixotropic agent, and an antioxidant.

8. The flux according to claim 3, further comprising at least one additional ingredient selected from the group consisting of a base material, a surfactant, a thixotropic agent, and an antioxidant.

9. The flux according to claim 5, further comprising at least one additional ingredient selected from the group consisting of a base material, a surfactant, a thixotropic agent, and an antioxidant.

10. The flux according to claim 6, further comprising at least one additional ingredient selected from the group consisting of a base material, a surfactant, a thixotropic agent, and an antioxidant.

11. The flux according to claim 1, wherein the flux further comprises a dimer acid which is a reaction product of oleic acid and linoleic acid.

12. The flux according to claim 1, wherein the solvent comprises at least one of isobornyl cyclohexanol and 2,4-diethyl-1,5-pentanediol.

13. A flux comprising: 1 wt % or more and 13 wt % or less of at least one acid selected from a dimer acid which is a reaction product of oleic acid and linoleic acid, a trimer acid which is a reaction product of oleic acid and linoleic acid, a hydrogenated dimer acid obtained by hydrogenating the dimer acid which is a reaction product of oleic acid and linoleic acid, and a hydrogenated trimer acid obtained by hydrogenating the trimer acid which is a reaction product of oleic acid and linoleic acid; and 65 wt % or more and 99 wt % or less of a solvent, wherein a weight after 10 mg of the flux is heated from 25° C. to 250° C. at a temperature rising rate of 1° C./sec in an $N_2$ atmosphere is 15% or less of the weight before heating,
wherein the solvent comprises at least one of isobornyl cyclohexanol and 2,4-diethyl-1,5-pentanediol.

14. A solder paste comprising:
solder powder; and
a flux, the flux comprising: 1 wt % or more and 13 wt % or less of at least one acid selected from a trimer acid which is a reaction product of oleic acid and linoleic acid, a hydrogenated dimer acid obtained by hydrogenating a dimer acid which is a reaction product of oleic acid and linoleic acid, and hydrogenated trimer acid obtained by hydrogenating the trimer acid which is a reaction product of oleic acid and linoleic acid; and 65 wt % or more and 99 wt % or less of a solvent, wherein a weight after 10 mg of the flux is heated from 25° C. to 250° C. at a temperature rising rate of 1° C./sec in an $N_2$ atmosphere is 15% or less of the weight before heating.

15. The solder paste according to claim 14, wherein the flux further comprises
0 wt % or more and 5 wt % or less of a different organic acid;
0 wt % or more and 10.0 wt % or less of rosin;
0 wt % or more and 5 wt % or less of an amine;
0 wt % or more and 5 wt % or less of an organohalogen compound; and
0 wt % or more and 1 wt % or less of an amine hydrohalide.

16. The solder paste according to claim 14, wherein the flux is free of rosin.

17. The solder paste according to claim 16, wherein the flux further comprises
0 wt % or more and 5 wt % or less of a different organic acid;
0 wt % or more and 5 wt % or less of an amine;
0 wt % or more and 5 wt % or less of an organohalogen compound; and
0 wt % or more and 1 wt % or less of an amine hydrohalide.

18. The solder paste according to claim 15, wherein the flux further comprises at least one additional ingredient selected from the group consisting of a base material, a surfactant, a thixotropic agent, and an antioxidant.

* * * * *

UNITED STATES PATENT AND TRADEMARK OFFICE
CERTIFICATE OF CORRECTION

PATENT NO. : 11,203,087 B2
APPLICATION NO. : 16/957753
DATED : December 21, 2021
INVENTOR(S) : Kawasaki et al.

Page 1 of 1

It is certified that error appears in the above-identified patent and that said Letters Patent is hereby corrected as shown below:

On the Title Page

Item (57), Column 2, Line 5, delete "form" and insert -- from --

Item (57), Column 2, Line 8, before "dimer" insert -- a --

In the Claims

Column 16, Line 55, Claim 1, delete "from," and insert -- from --

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*